United States Patent

Nakajima et al.

(10) Patent No.: US 9,990,088 B2
(45) Date of Patent: Jun. 5, 2018

(54) INPUT DEVICE, METHOD OF CONTROLLING THE SAME, AND PROGRAM

(71) Applicant: Alps Electric Co., Ltd., Tokyo (JP)

(72) Inventors: Satoshi Nakajima, Miyagi-ken (JP); Satoshi Hayasaka, Miyagi-ken (JP); Tomoya Sasaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 62 days.

(21) Appl. No.: 15/227,784

(22) Filed: Aug. 3, 2016

(65) Prior Publication Data

US 2017/0060338 A1 Mar. 2, 2017

(30) Foreign Application Priority Data

Aug. 31, 2015 (JP) .................................. 2015-171107

(51) Int. Cl.
  *G06F 3/044* (2006.01)
  *G06F 3/041* (2006.01)
  *G06F 3/0488* (2013.01)

(52) U.S. Cl.
  CPC ............ *G06F 3/0418* (2013.01); *G06F 3/044* (2013.01); *G06F 3/04883* (2013.01); *G06F 2203/04108* (2013.01)

(58) Field of Classification Search
  CPC .............................. G06F 3/0416; G06F 3/044
  USPC ................................ 178/18.01; 345/173, 174
  See application file for complete search history.

(56) References Cited

U.S. PATENT DOCUMENTS

| 5,229,551 | A | 7/1993 | McDermott et al. |
| 8,564,546 | B1 * | 10/2013 | Birch ................... G06F 3/0416 178/18.01 |
| 2012/0098766 | A1 * | 4/2012 | Dippel ................. G06F 3/0416 345/173 |
| 2015/0199068 | A1 | 7/2015 | Arima |
| 2015/0212623 | A1 * | 7/2015 | Hatano ................... G06F 3/044 345/174 |
| 2015/0355740 | A1 | 12/2015 | Yumoto et al. |

FOREIGN PATENT DOCUMENTS

| JP | 2009-258903 | 11/2009 |
| WO | 2012/117437 A1 | 9/2012 |

OTHER PUBLICATIONS

European Search Report dated Dec. 23, 2016 from European Application No. 16186311.

\* cited by examiner

*Primary Examiner* — Abdul-Samad A Adediran
(74) *Attorney, Agent, or Firm* — Beyer Law Group LLP

(57) ABSTRACT

Evaluation values regarding a change in velocity of an object at coordinates of a detection surface are calculated on the basis of a series of coordinate data of the same object, and it is determined whether there is an error in each coordinate data on the basis of the evaluation values. In a case in which an extreme change in a velocity of the object occurs due to an influence of noise or the like, it is possible to accurately determine an error of the coordinate data on the basis of the evaluation values. Since the coordinate data in which it is determined that there is an error is corrected with data indicating the same coordinate P as that of coordinate data immediately before such coordinate data, the error of the detection result of the coordinates can be effectively reduced.

7 Claims, 6 Drawing Sheets

INPUT DEVICE, METHOD OF CONTROLLING THE SAME, AND PROGRAM

CLAIM OF PRIORITY

This application claims benefit of Japanese Patent Application No. 2015-171107 filed on Aug. 31, 2015, which is hereby incorporated by reference.

BACKGROUND OF THE INVENTION

1. Field of the Invention

The present invention relates to an input device that inputs information according to an approach state of an object using a change in capacitance or the like, a method of controlling the input device, and a program and, particularly, to an input device that inputs information according to an operation of a finger, a pen, or the like in various information devices such as a computer.

2. Description of the Related Art

Since a sensor that detects a change in capacitance can detect the approach of an object (for example, a finger or a pen) with a simple configuration, the sensor is widely used for user interface devices of various electronic devices, such as touch pads of notebook type computers or touch panels of smart phones.

In International Publication No. WO 2012/117437, a touch panel device including a touch panel unit in which a plurality of electrodes are arranged is described. A scan electrode is determined from among the plurality of electrodes of the touch panel unit, and the touch panel unit is operated for the determined scan electrode. Accordingly, a measurement value reflecting a change in capacitance of each electrode is acquired, and it is detected whether the touch panel unit is touched on the basis of the acquired measurement value.

However, since such an input device is required to sensitively detect the approach of an object to a detection surface of a sensor, there is a problem in that the sensor is particularly susceptible to external electromagnetic noise. For example, in the case of the above-described capacitive sensor, since a change in capacitance of an electrode caused by the approach of an object is detected as a small change in the amount of charge, there is a problem in that an error is easily generated in a detection result of coordinates of an object due to an influence of noise.

SUMMARY OF THE INVENTION

The present invention provides an input device capable of reducing an error generated in a result of detection of coordinates of an object due to an influence of noise or the like, a method of controlling the input device, and a program.

An input device according to a first aspect of the present invention is an input device that inputs information according to a state of approach of an object to a detection surface, and includes: a sensor unit configured to detect the state of approach of the object at a plurality of positions of the detection surface; a sensor control unit configured to control the sensor unit so that the sensor unit performs a periodic detection operation of detecting the state of approach of the object at the plurality of positions in each cycle; a coordinate data generation unit configured to generate coordinate data indicating coordinates of a position of the same object approaching the detection surface over a plurality of cycles of the detection operation on the basis of a result of the detection of the sensor unit in each cycle of the detection operation; an error determination unit configured to calculate an evaluation value regarding a change in a velocity of the object at the coordinates of the detection surface indicated by individual coordinate data on the basis of a series of coordinate data of the same object generated in the data generation unit, and determine whether or not there is an error of each coordinate data on the basis of the calculated evaluation value; and an error correction unit configured to perform a correction process of correcting the coordinate data in which it is determined that there is an error by the error determination unit in time-series of coordinate data of the same object generated in the coordinate data generation unit with data indicating the same coordinate as that of coordinate data immediately before such coordinate data.

According to the above configuration, the evaluation values regarding a change in velocity of the object at the coordinates on the detection surface indicated by the individual coordinate data are calculated on the basis of the series of coordinate data of the same object, and it is determined whether or not there is an error in each coordinate data on the basis of the evaluation values. Therefore, in a case in which the coordinate data indicating an abnormal coordinate is generated and an extreme change in velocity of the object occurs due to the influence of noise or the like, it is possible to accurately determine the error of the coordinate data on the basis of the evaluation values.

Further, according to the above configuration, the coordinate data in which it is determined that there is an error in time-series of coordinate data of the same object is corrected with the data indicating the same coordinate as that of coordinate data immediately before such coordinate data. Therefore, an error of a coordinate detection result generated due to the influence of noise or the like is reduced.

Preferably, the error determination unit may calculate the evaluation value on the basis of consecutive coordinate data of N cycles of the same object (N indicates an integer equal to or greater than 3), and determine whether or not there is an error in the last generated coordinate data of the N cycles on the basis of the calculated evaluation value. In a case in which coordinate data in which it is determined that there is an error in the error determination unit is included in consecutive coordinate data of (N−1) cycles of the same object, the error correction unit may defer the correction process for coordinate data generated in a cycle following the (N−1) cycle.

According to the above configuration, the evaluation value is calculated on the basis of consecutive coordinate data of N cycles of the same object, and it is determined whether or not there is an error in the last generated coordinate data of the N cycles on the basis of the evaluation value. Therefore, in a case in which coordinate data in which it is determined that there is an error is included in the coordinate data of (N−1) cycles of the first half in the coordinate data of N cycles, the evaluation value becomes inaccurate, and a determination of an error for the last generated coordinate data of the N cycles also becomes inaccurate. However, in the error correction unit, in a case in which the coordinate data in which it is determined that there is an error is included in the consecutive coordinate data of (N−1) cycles of the same object, a correction process for the coordinate data generated in a cycle following the (N−1) cycles is deferred. Accordingly, since the correction process of the coordinate data is not performed on the basis of the inaccurate error determination result, it is possible to appropriately correct the error of the coordinate data due to the influence of noise or the like.

Preferably, in a case in which the coordinate data of an error determination target in the error determination unit is first coordinate data, coordinate data before i cycles from the first coordinate data (i indicates a natural number) is (i+1)-th coordinate data, and a vector directed from a coordinate indicated by the (i+1)-th coordinate data to a coordinate indicated by i-th coordinate data is an i-th velocity vector, the error determination unit calculates a first evaluation value according to a magnitude of a first acceleration vector that is a vector obtained by subtracting the second velocity vector from the first velocity vector, and determines that there is an error in the first coordinate data in a case in which the first evaluation value is greater than a first threshold value.

According to the above configuration, in a case in which an error is generated in the first coordinate data due to an influence of noise or the like, and accordingly, the first velocity vector becomes a vector greatly different from the second velocity vector, the magnitude of the first acceleration vector that is a vector obtained by subtracting the second velocity vector from the first velocity vector abnormally increases. Therefore, in a case in which the first evaluation value is greater than the first threshold value, it is determined that there is an error in the first coordinate data.

Preferably, the error determination unit may calculate a second evaluation value according to a magnitude of a second acceleration vector that is a vector obtained by subtracting the third velocity vector from a vector of an average of the first velocity vector and the second velocity vector, and determine that there is no error in the first coordinate data if the second evaluation value is smaller than a second threshold value in a case in which the first evaluation value is greater than the first threshold value.

Accordingly, in a case in which a vector of an average of the first velocity vector and the second velocity vector, and the third velocity vector are relatively close vectors, the magnitude of the second acceleration vector decreases and the second evaluation value becomes smaller than the second threshold value. Accordingly, it is determined that there is no error in the first coordinate data.

Preferably, the error determination unit may calculate a third evaluation value according to a magnitude of a third acceleration vector that is a vector obtained by subtracting a vector of an average of the second velocity vector and the third velocity vector from the first velocity vector, and determine that there is no error in the first coordinate data if the third evaluation value is smaller than a third threshold value even in a case in which the first evaluation value is greater than the first threshold value.

Accordingly, in a case in which the first velocity vector and a vector of an average of the second velocity vector and the third velocity vector are relatively close vectors, a magnitude of the third acceleration vector decreases and the third evaluation value becomes smaller than the third threshold value. Accordingly, it is determined that there is no error in the first coordinate data.

A method of controlling an input device according to a second aspect of the present invention is a method by which a computer controls an input device that includes a sensor unit configured to detect a state of approach of an object at a plurality of positions of a detection surface, and inputs information according to the state of approach of the object to the detection surface, and includes the steps of: controlling the sensor unit so that the sensor unit performs a periodic detection operation of detecting the state of approach of the object at the plurality of positions in each cycle; generating coordinate data indicating coordinates of a position of the same object approaching the detection surface over a plurality of cycles of the detection operation on the basis of a result of the detection of the sensor unit in each cycle of the detection operation; calculating an evaluation value regarding a change in velocity of the object at the coordinates of the detection surface indicated by individual coordinate data on the basis of a series of coordinate data of the same object generated in the step of generating coordinate data, and determining whether or not there is an error of each coordinate data on the basis of the calculated evaluation value; and performing a correction process of correcting the coordinate data in which it is determined that there is an error in the step of determining whether or not there is an error of the coordinate data in time-series of coordinate data of the same object generated in the step of generating coordinate data with data indicating the same coordinate as that of coordinate data immediately before such coordinate data.

Preferably, the step of determining whether or not there is an error of the coordinate data may include calculating the evaluation value on the basis of consecutive coordinate data of N cycles of the same object (N indicates an integer equal to or greater than 3), and determining whether or not there is an error in the last generated coordinate data of the N cycles on the basis of the calculated evaluation value. The step of correcting the error of the coordinate data may include deferring the correction process for coordinate data generated in a cycle following an (N−1) cycle in a case in which coordinate data in which it is determined that there is an error in the step of determining whether or not there is an error of the coordinate data is included in consecutive coordinate data of (N−1) cycles of the same object.

Preferably, in a case in which the coordinate data of an error determination target in the step of determining whether or not there is an error of the coordinate data is first coordinate data, coordinate data before i cycles from the first coordinate data (i indicates a natural number) is (i+1)-th coordinate data, and a vector directed from a coordinate indicated by the (i+1)-th coordinate data to a coordinate indicated by i-th coordinate data is an i-th velocity vector, the step of determining whether or not there is an error of the coordinate data may include calculating a first evaluation value according to a magnitude of a first acceleration vector that is a vector obtained by subtracting the second velocity vector from the first velocity vector, and determining that there is an error in the first coordinate data in a case in which the first evaluation value is greater than a first threshold value.

Preferably, the step of determining whether or not there is an error of the coordinate data may include calculating a second evaluation value according to a magnitude of a second acceleration vector that is a vector obtained by subtracting a third velocity vector from a vector of an average of the first velocity vector and the second velocity vector, and determining that there is no error in the first coordinate data if the second evaluation value is smaller than a second threshold value even in a case in which the first evaluation value is greater than the first threshold value.

Preferably, the step of determining whether or not there is an error of the coordinate data may include calculating a third evaluation value according to a magnitude of a third acceleration vector that is a vector obtained by subtracting a vector of an average of the second velocity vector and the third velocity vector from the first velocity vector, and determining that there is no error in the first coordinate data if the third evaluation value is smaller than a third threshold value even in a case in which the first evaluation value is greater than the first threshold value.

A third aspect of the present invention relates to a program for causing a computer to execute the method of controlling an input device according to the second aspect.

According to the present invention, it is possible to reduce an error generated in a result of detection of coordinates of the object due to an influence of noise or the like.

DETAILED DESCRIPTION OF THE INVENTION

Figure 1:
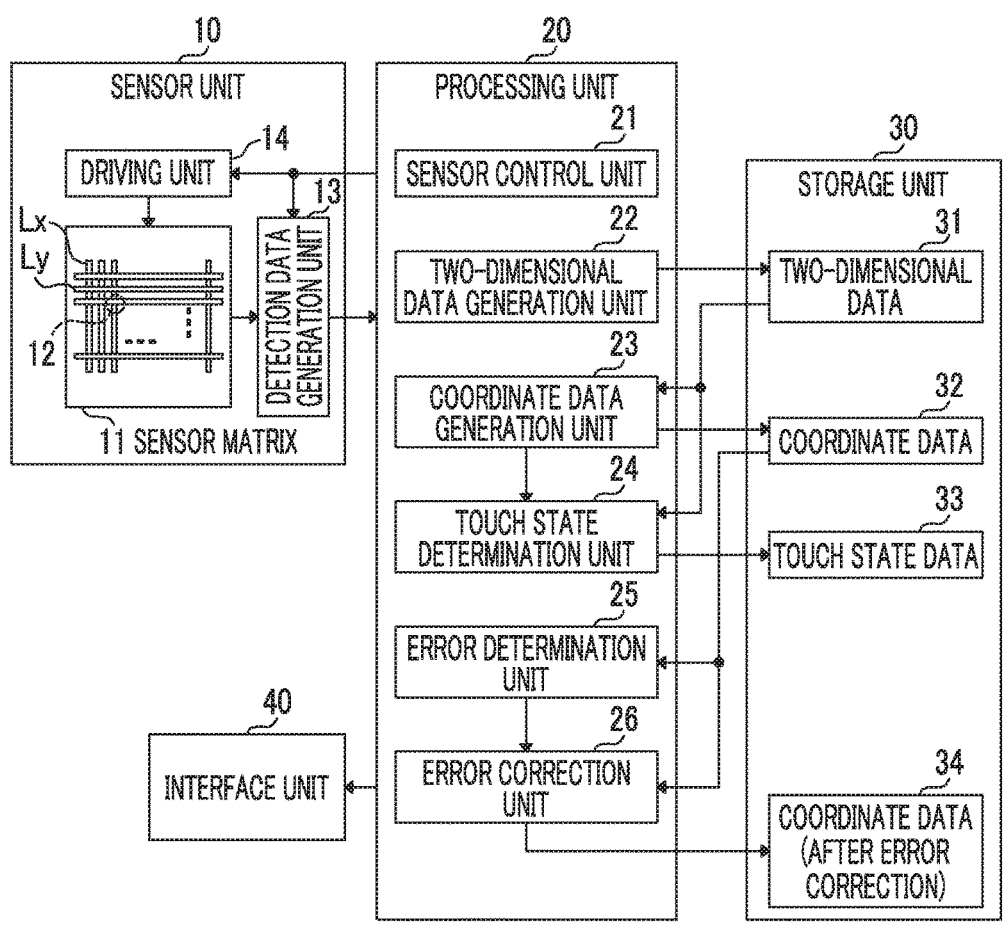
FIG. 1 is a diagram illustrating an example of a configuration of an input device according to an embodiment of the present invention.

FIG. 1 is a diagram illustrating an example of a configuration of an input device according to an embodiment of the present invention.

The input device illustrated in FIG. 1 includes a sensor unit 10, a processing unit 20, a storage unit 30, and an interface unit 40. The input device according to this embodiment is a device that inputs information according to an approach state by causing an object such as a finger or a pen to approach a detection surface on which a sensor is provided. The "approach" in this specification includes both of being close in a contact state and being close in a non-contact state.

Sensor Unit 10

The sensor unit 10 detects a degree of approach of an object such as a finger or a pen at each of a plurality of detection positions distributed in a detection surface, and generates a result of the detection as detection data. For example, the sensor unit 10 includes a sensor matrix 11 in which capacitive sensor elements (capacitors) 12 of which the capacitance changes according to the approach of an object are formed in a matrix form, a detection data generation unit 13 that generates detection data corresponding to the capacitance of a capacitive sensor element 12, and a driving unit 14 that applies a driving voltage to the capacitive sensor element 12.

The sensor matrix 11 includes a plurality of driving electrodes Lx extending in a vertical direction, and a plurality of detection electrodes Ly extending in a horizontal direction. The plurality of driving electrodes Lx are arranged in parallel in the horizontal direction, and the plurality of detection electrodes Ly are arranged in parallel in the vertical direction. The plurality of driving electrodes Lx and the plurality of detection electrodes Ly intersect in a grating form, and are insulated from each other. The capacitive sensor element 12 is formed near an intersection portion of the driving electrode Lx and the detection electrode Ly. Further, in the example of FIG. 1, shapes of the electrodes (Lx and Ly) are drawn in a strip shape, but may be any other shape (for example, a diamond pattern).

The driving unit 14 applies a driving voltage to each capacitive sensor element 12 of the sensor matrix 11. For example, the driving unit 14 sequentially selects one driving electrode Lx from among the plurality of driving electrodes Lx under the control of the processing unit 20, and periodically changes a potential of the selected driving electrode Lx. A potential of the driving electrode Lx changes in a predetermined range, and thus, the driving voltage applied to the capacitive sensor element 12 formed near the intersection point of this driving electrode Lx and the detection electrode Ly changes in a predetermined range, and the capacitive sensor element 12 is charged or discharged.

The detection data generation unit 13 generates the detection data according to charge transferred in each detection electrode Ly when the capacitive sensor element 12 is charged or discharged due to the driving unit 14 applying the driving voltage. That is, the detection data generation unit 13 samples the charge transferred in each detection electrode Ly at a timing synchronized with a periodic change in the driving voltage of the driving unit 14, and generates the detection data indicating a degree of approach of the object according to a result of the sampling.

For example, the detection data generation unit 13 includes a capacitance-to-voltage conversion circuit (CV conversion circuit) that outputs a voltage according to the capacitance of the capacitive sensor element 12, and an analog-to-digital conversion circuit (AD conversion circuit) that converts an output signal of the CV conversion circuit into a digital signal and outputs the digital signal as detection data.

The CV conversion circuit samples the charge transferred in the detection electrode Ly under control of the processing unit 20 each time the driving voltage of the driving unit 14 periodically changes and the capacitive sensor element 12 is charged or discharged. Specifically, each time a positive or negative charge is transferred in the detection electrode Ly, the CV conversion circuit transfers this charge or a charge proportional thereto to a capacitor for reference, and outputs a signal according to a voltage generated in the capacitor for reference. For example, the CV conversion circuit outputs a signal according to an integrated value or an average value of the charge periodically transferred in the detection electrode Ly or a charge proportional thereto. The AD conversion circuit converts the output signal of the CV conversion circuit into a digital signal in a predetermined period under control of the processing unit 20, and outputs a result of the conversion as detection data indicating the degree of approach of the object.

Further, while the sensor unit 10 shown in the above-described example detects approach of the object on the basis of a change in the capacitance (mutual capacitance) generated between the electrodes (Lx and Ly), the present invention is not limited thereto and the approach of the object may be detected using various other schemes. For example, the sensor unit 10 may adopt a scheme of detecting capacitance (self-capacitance) generated between the electrode and a ground due to the approach of the object. In the case of a scheme of detecting the self-capacitance, a driving voltage is applied to the detection electrode. Further, the sensor unit 10 is not limited to a capacitance scheme, and may be of, for example, a resistance film scheme or an electromagnetic induction type.

Processing Unit 20

The processing unit 20 is a circuit that controls an entire operation of the input device and includes, for example, a computer that performs processing according to instruction codes of a program stored in the storage unit 30 to be described or a logic circuit that realizes a specific function. All of the processing of the processing unit 20 may be realized by the computer and the program, or a part or all thereof may be realized by a dedicated logic circuit.

In the example of FIG. 1, the processing unit 20 includes a sensor control unit 21, a two-dimensional data generation unit 22, a coordinate data generation unit 23, a touch state determination unit 24, an error determination unit 25, and an error correction unit 26.

The sensor control unit 21 controls the sensor unit 10 so that the sensor unit 10 performs a periodic detection operation of detecting the degree of approach of the object in a plurality of detection positions (capacitive sensor elements 12 of the sensor matrix 11) of a detection surface in every one of cycles. Specifically, the sensor control unit 21 controls circuits of the driving unit 14 and the detection data generation unit 13 so that selection of the driving electrode and generation of a pulse voltage in the driving unit 14, and selection of the detection electrode and generation of detection data in the detection data generation unit 13 are periodically performed at an appropriate timing.

Based on the detection result of the sensor unit 10, the two-dimensional data generation unit 22 generates two-dimensional data 31 in a matrix form that includes a plurality of data on the basis of the degree of approach of the object at a plurality of positions on the detection surface, and stores the two-dimensional data 31 in the storage unit 30.

For example, the two-dimensional data generation unit 22 stores the detection data output from the sensor unit 10 in matrix form in a storage area (current value memory) of the storage unit 30. The two-dimensional data generation unit 22 calculates a difference between the detection data in a matrix form stored in the current value memory and a base value in a matrix form previously stored in another storage area (base value memory) of the storage unit 30, and stores a result of the calculation as two-dimensional data 31 in the storage unit 30. In the base value memory, a value (base value) serving as a reference of the detection data in a state in which the object does not approach the detection surface is stored. The two-dimensional data 31 indicates a change amount of the detection data from the state in which the object does not approach the detection surface.

The coordinate data generation unit 23 generates the coordinate data 32 indicating the coordinates of the position of the same object approaching the detection surface over a plurality of cycles of the detection operation in the sensor unit 10 on the basis of the detection result of the sensor unit 10 at each cycle of the detection operation. For example, the coordinate data generation unit 23 specifies an approach area of the object on the detection surface on the basis of the two-dimensional data 31 generated by the two-dimensional data generation unit 22, and calculates the coordinate data 32 of the object from a shape of the specified approach area, a distribution of data values within the approach area, or the like. This coordinate data 32 includes, for example, a pair of X and Y coordinates in an X-Y coordinate system (a two-dimensional coordinate system) set in the detection surface. In the following description, coordinates indicated by the coordinate data 32 may be expressed as "coordinate P" or "coordinate P [X, Y]".

The coordinate data generation unit 23 assigns the same identification code to the coordinate data 32 of the same object over a plurality of cycles of the detection operation in the sensor unit 10. The identification code is information for tracking the same object over a plurality of cycles. For example, the coordinate data generation unit 23 calculates a distance between the coordinate P indicated by the coordinate data 32 generated in the previous cycle and the coordinates P indicated by the coordinate data 32 newly generated in the current cycle and specifies a combination of the previous coordinate P and the current coordinate P between which the distances is shortest, as a pair of coordinates P of the same object. The coordinate data generation unit 23 assigns the same identification code as that of the coordinate data 32 according to the previous coordinate P of the same object to the coordinate data 32 according to the current coordinate P.

The touch state determination unit 24 determines a state of touch to the detection surface (whether there is contact with the detection surface) of the object of which the coordinate data 32 is generated by the coordinate data generation unit 23 in each cycle of the detection operation, and generates a result of the determination as touch state data 33. For example, the touch state determination unit 24 calculates a degree of approach of the object at the coordinate P indicated by the coordinate data 32 on the basis of the two-dimensional data 31, compares the calculated degree of approach with a predetermined threshold value, and generates the touch state data 33 indicating whether or not the object touches (contacts) the detection surface on the basis of a result of the comparison.

The touch state data 33 generated for one item of coordinate data 32 is stored in the storage unit 30 in association with the one item of coordinate data 32. Accordingly, in the storage unit 30, a series of coordinate data 32 in which an identification code is assigned to each object is stored, and the touch state data 33 associated with each coordinate data 32 is stored.

The error determination unit 25 calculates an evaluation value regarding a change in a velocity of the object at coordinates of the detection surface indicated by the individual coordinate data 32 on the basis of a series of coordinate data 32 of the same object generated in the coordinate data generation unit 23. The error determination unit 25 determines whether or not there is an error of each coordinate data 32 on the basis of the calculated evaluation value.

For example, the error determination unit 25 calculates first evaluation value E1 on the basis of consecutive coordinate data 32 of three cycles of the same object, and calculates second evaluation value E2 and third evaluation value E3 on the basis of consecutive coordinate data 32 of four cycles of the same object. The error determination unit 25 determines whether or not there is an error in the last generated coordinate data 32 of four cycles on the basis of the three evaluation values (E1 to E3).

In the following description, coordinate data 32 of an error determination target in the error determination unit 25 is referred to as "first coordinate data PD1", coordinate data 32 before one cycle from the first coordinate data PD1 is referred to as "second coordinate data PD2," coordinate data 32 before two cycles from the first coordinate data PD1 is referred to as "third coordinate data PD3", and coordinate data 32 before three cycles from the first coordinate data PD1 is referred to as "fourth coordinate data PD4". Further, a coordinate indicated by the first coordinate data PD1 is referred to as a "coordinate P1" or a "coordinate P1 [X1, Y1]", a coordinate indicated by the second coordinate data PD2 is referred to as a "coordinate P2" or a "coordinate P2 [X2, Y2]", a coordinate indicated by the third coordinate data PD3 is referred to as a "coordinate P3" or a "coordinate P3 [X3, Y3]", and a coordinate indicated by the fourth coordinate data PD4 is referred to as a "coordinate P4" or a "coordinate P4 [X4, Y4]". The error determination unit 25 calculates evaluation values (E1 to E3) on the basis of the first coordinate data PD1, the second coordinate data PD2, the third coordinate data PD3, and the fourth coordinate data PD4 of the coordinate data 32 of four cycles of the same object.

Further, in the following description, a vector directed from a coordinates P2 [X2, Y2] to a coordinate P1 [X1, Y1] is referred to as a "first velocity vector V1", a vector directed from a coordinates P3 [X3, Y3] to the coordinate P2 [X2, Y2] is referred to as a "second velocity vector V1", and a vector directed from a coordinates P4 [X4, Y4] to the coordinate P3 [X3, Y3] is referred to as a "third velocity vector V1".

Figure 2:
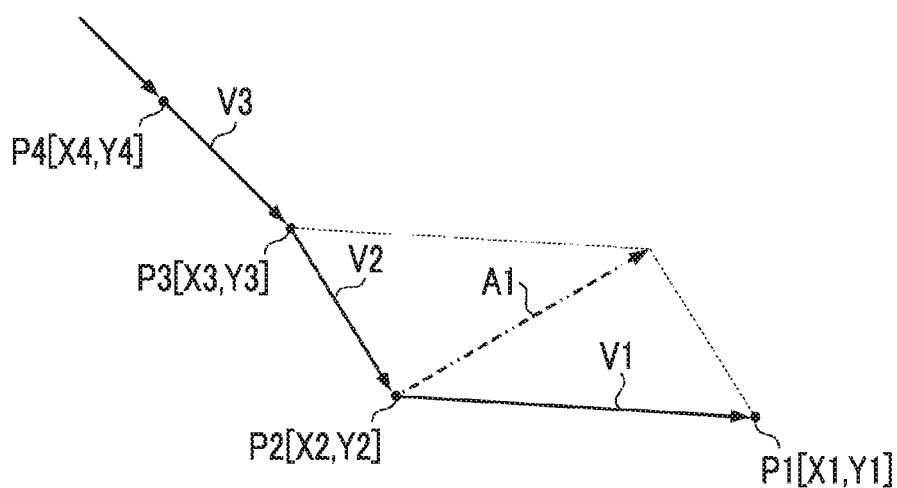
FIG. 2 is a diagram illustrating a first acceleration vector.

The error determination unit 25 calculates, as a "first evaluation value E1", a square of magnitude of a "first acceleration vector A1" that is a vector obtained by subtracting the second velocity vector V2 from the first velocity vector. FIG. 2 is a diagram illustrating the first acceleration vector A1. The first evaluation value E1 is expressed as the following equation.

Equation (1)

$$E2 = |A2|^2 \quad (2)$$
$$= |(V1+V2)/2 - V3|^2$$
$$= (X1/2 - 3 \cdot X3/2 + X4)^2 + (Y1/2 - 3 \cdot Y3/2 + Y4)^2$$

Figure 3:
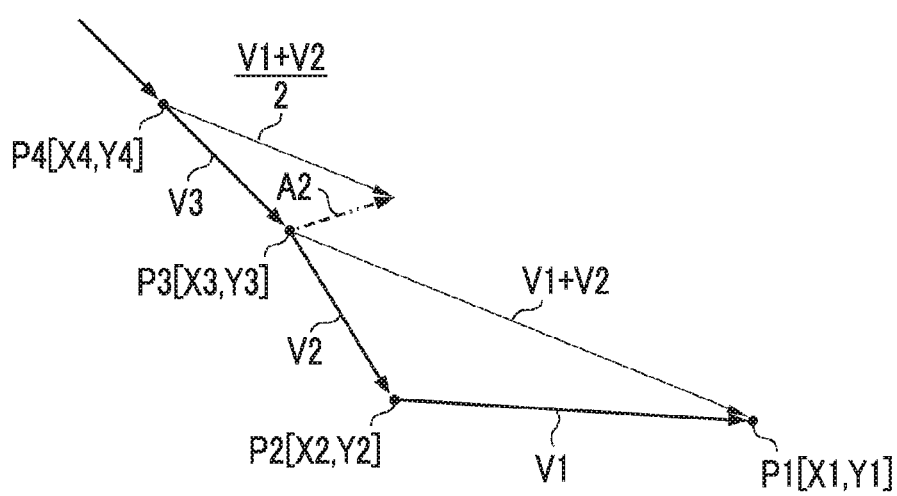
FIG. 3 is a diagram illustrating a second acceleration vector.

Further, the error determination unit 25 calculates, as a "second evaluation value E2", a square of magnitude of a "second acceleration vector A2" that is a vector obtained by subtracting the third velocity vector V3 from an average vector of the first velocity vector V1 and the second velocity vector V2. FIG. 3 is a diagram illustrating the second acceleration vector A2. In the example of FIG. 3, the vector of an average of the first velocity vector V1 and the second velocity vector V2 is obtained by "(V1+V2)/2" obtained by dividing a sum of the vectors by 2. The second evaluation value E2 is expressed as the following equation.

Equation (2)

$$E2 = |A2|^2 \quad (2)$$
$$= |(V1+V2)/2 - V3|^2$$
$$= (X1/2 - 3 \cdot X3/2 + X4)^2 + (Y1/2 - 3 \cdot Y3/2 + Y4)^2$$

Figure 4:
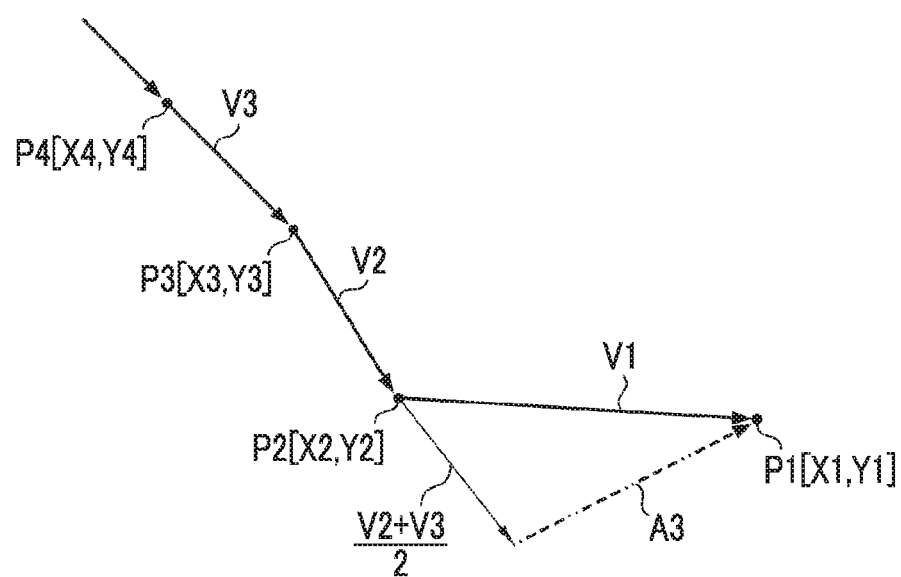
FIG. 4 is a diagram illustrating a third acceleration vector.

Further, the error determination unit 25 calculates, as the third evaluation value E3, a square of magnitude of a "third acceleration vector A3" that is a vector obtained by subtracting a vector of an average of the second velocity vector V2 and the third velocity vector V3 from the first velocity vector V1. FIG. 4 is a diagram illustrating the third acceleration vector A3. In the example of FIG. 4, the vector of the average of the second velocity vector V2 and the third velocity vector V3 is obtained using "(V2+V3)/2" that is obtained by dividing a sum of the vectors by 2. The third evaluation value E3 is expressed using the following equation.

Equation (3)

$$E3 = |A3|^2 \quad (3)$$
$$= |V1 - (V2+V3)/2|^2$$
$$= (X1 - 3 \cdot X2/2 + X4/2)^2 + (Y1 - 3 \cdot Y2/2 + Y4/2)^2$$

In a case in which the first to third evaluation values E1 to E3 calculated using Equations (1) to (3) are all greater than predetermined threshold values, the error determination unit 25 determines that there is an error in the first coordinate data PD1. That is, in a case in which the first evaluation value E1 is greater than a first threshold value Th1, the second evaluation value E2 is greater than a second threshold value Th2, and the third evaluation value E3 is greater than a third threshold value Th3, the error determination unit 25 determines that there is an error the first coordinate data PD1. In a case in which the second evaluation value E2 is smaller than the second threshold Th2 or a case in which the third evaluation value E3 is smaller than the third threshold Th3 even in case in which the first evaluation value E1 is greater than the first threshold Th1, the error determination unit 25 determines that there is no error in the first coordinate data PD1.

Figure 5:
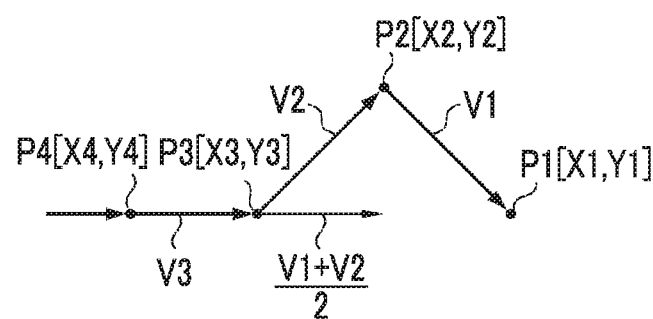
FIG. 5 is a diagram illustrating an example of a case in which the second acceleration vector becomes small.
Figure 6:
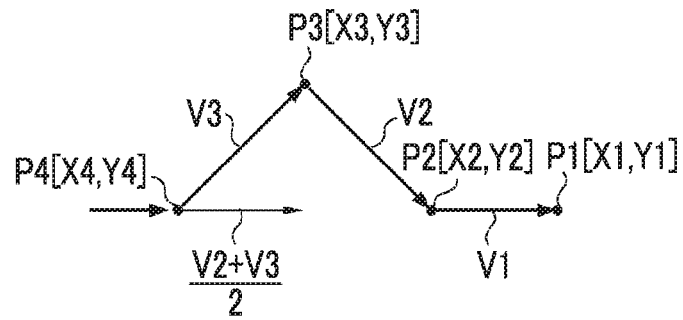
FIG. 6 is a diagram illustrating an example of a case in which the third acceleration vector becomes small.

FIG. 5 is a diagram illustrating an example of a case in which the second acceleration vector A2 becomes small, and FIG. 6 is a diagram illustrating an example of a case in which the third acceleration vector A3 becomes small. In a case in which a series of velocity vectors are close to the pattern illustrated in FIG. 5 or 6 even in a case in which the first acceleration vector A1 is large, the error determination unit 25 determines that there is no error in the first coordinate data PD1. Accordingly, since a pattern of an abnormal velocity vector due to the influence of noise or the like is easily narrowed down, accuracy of the error determination is improved.

The above is the description of the error determination unit 25.

The error correction unit 26 performs a correction process of correcting the coordinate data 32 in which it is determined that there is an error by the error determination unit 25 in the time-series of coordinate data 32 of the same object generated in the coordinate data generation unit 23 with data indicating the same coordinate P as coordinate data 32 immediately before the coordinate data 32. That is, in a case in which it is determined that there is an error in the first coordinate data PD1 of one cycle, the error correction unit 26 outputs the second coordinate data PD2 in place of the first coordinate data PD1, as the coordinate data of the one cycle.

The error correction unit 26 stores, in the storage unit 30, a result of performing the correction process according to the error determination result described above on the time-series of coordinate data 32 stored in the storage unit 30, as the time-series of coordinate data 34 after error correction.

In a case in which the coordinate data 32 in which it is determined that there is an error in the error determination unit 25 is included in the consecutive coordinate data of three cycles of the same object, the error correction unit 26 defers the above-described correction process for the coordinate data 32 generated in a cycle next to the three cycles.

Storage Unit 30

The storage unit 30 stores constant data or variable data that is used for processing in the processing unit 20. When the processing unit 20 includes a computer, the storage unit 30 may store a program to be executed in the computer. The storage unit 30 includes, for example, a volatile memory such as a DRAM or an SRAM, a nonvolatile memory such as a flash memory, a hard disk, or the like.

Interface Unit 40

The interface unit 40 is a circuit for exchanging data between the input device and another control device (for example, a control IC of an information device having an input device mounted thereon). The processing unit 20 outputs information (for example, the coordinate data 34 after error correction, or the touch state data 33) stored in the storage unit 30 from the interface unit 40 to a control device (not illustrated). Further, the interface unit 40 may acquire a program to be executed in a computer of the processing unit 20 from a disk drive device (not illustrated) (a device that reads a program recorded in a non-transitory storage medium), a server, or the like, and load the program onto the storage unit 30.

Figure 7:
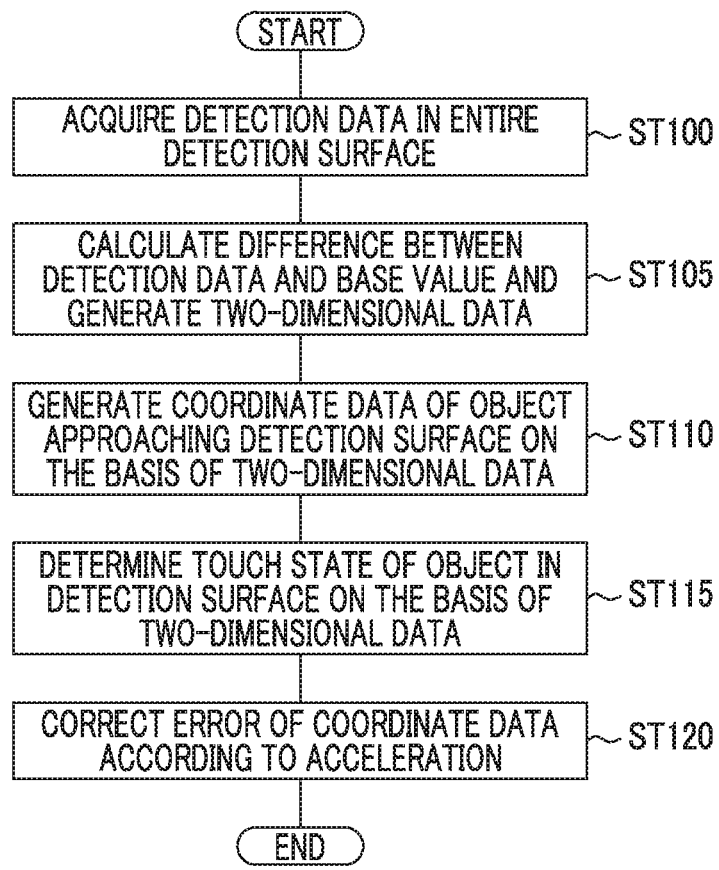
FIG. 7 is a flowchart illustrating an example of a process that is executed in each cycle of a detection operation.

Next, an operation of the input device having the above-described configuration will be described. FIG. 7 is a flowchart illustrating an example of an operation of an input device according to this embodiment, and illustrates an example of a process that is executed in each cycle of the detection operation of the sensor unit 10. A series of processes illustrated in FIG. 7 is executed in each detection operation of one cycle in which the sensor unit 10 detects the approach state of the object at a plurality of detection positions of the detection surface.

ST100:

The sensor control unit 21 controls the sensor unit 10 so that the sensor unit 10 detects a degree of approach of the object on the entire surface of the detection surface (the sensor matrix 11). The two-dimensional data generation unit 22 acquires the detection data of the entire detection surface which is generated as the detection result of the sensor unit 10.

ST105:

The two-dimensional data generation unit 22 calculates a difference between the detection data of each detection position of the detection surface acquired from the sensor unit 10 and a base value of each detection position set in advance. For example, the two-dimensional data generation unit 22 temporarily stores the detection data of each detection position of the detection surface acquired from the sensor unit 10 in matrix form in a predetermined storage area (current value memory) of the storage unit 30. The two-dimensional data generation unit 22 calculates a difference between a base value in a matrix form stored in another storage area (base value memory) of the storage unit 30 in advance and the detection data in a matrix form stored in the current value memory, and stores a result of the calculation as two-dimensional data 31 in the storage unit 30. In the base value memory, a value (base value) that is a reference of the detection data in a state in which the object does not approach the detection surface is stored. Each data constituting the two-dimensional data 31 corresponds to a change amount of each detection data from the state in which the object does not approach the detection surface, and indicates the degree of approach of the object at each detection position relative to a non-approach state of the object.

ST110:

The coordinate data generation unit 23 generates the coordinate data 32 of each object approaching the detection surface on the basis of the two-dimensional data 31 calculated in step ST105. For example, on the basis of a distribution of the degree of approach of the object on the detection surface indicated by the two-dimensional data 31, the coordinate data generation unit 23 generates a position at which the degree of approach of the object is higher than a predetermined reference as the coordinate data 32 of the object approach position.

Further, the coordinate data generation unit 23 assigns the identification code for tracking the same object over a plurality of cycles to the coordinate data 32. For example, the coordinate data generation unit 23 calculates a distance between the coordinates of the approach position of each object in a previous cycle and the coordinates of the approach position of each object in a current cycle, and specifies a pair of coordinates between which the distance is short as a pair of coordinates of the same object. The coordinate data generation unit 23 determines the identification code to be assigned to the coordinate data 32 of each object generated in the current cycle on the basis of a pair of coordinates of the same object that has been specified.

ST115:

The touch state determination unit 24 calculates a degree of approach of the object at the coordinate P indicated by the coordinate data 32 generated by the coordinate data generation unit 23 on the basis of the two-dimensional data 31, compares the calculated degree of approach with a predetermined threshold value, and determines whether the object touches (contacts) the detection surface on the basis of a result of the comparison. The touch state determination unit 24 generates the touch state data 33 indicating a state of touch of the object to the detection surface, and stores the touch state data 33 in the storage unit 30 in association with the coordinate data 32. In a case in which the coordinate data 32 of a plurality of objects are generated, the touch state determination unit 24 performs a determination of the touch state on each coordinate data 32 to generate the touch state data 33.

ST120:

The error determination unit 25 and the error correction unit 26 perform correction of the error according to the acceleration on the coordinate data generated in step ST110.

Figure 8:
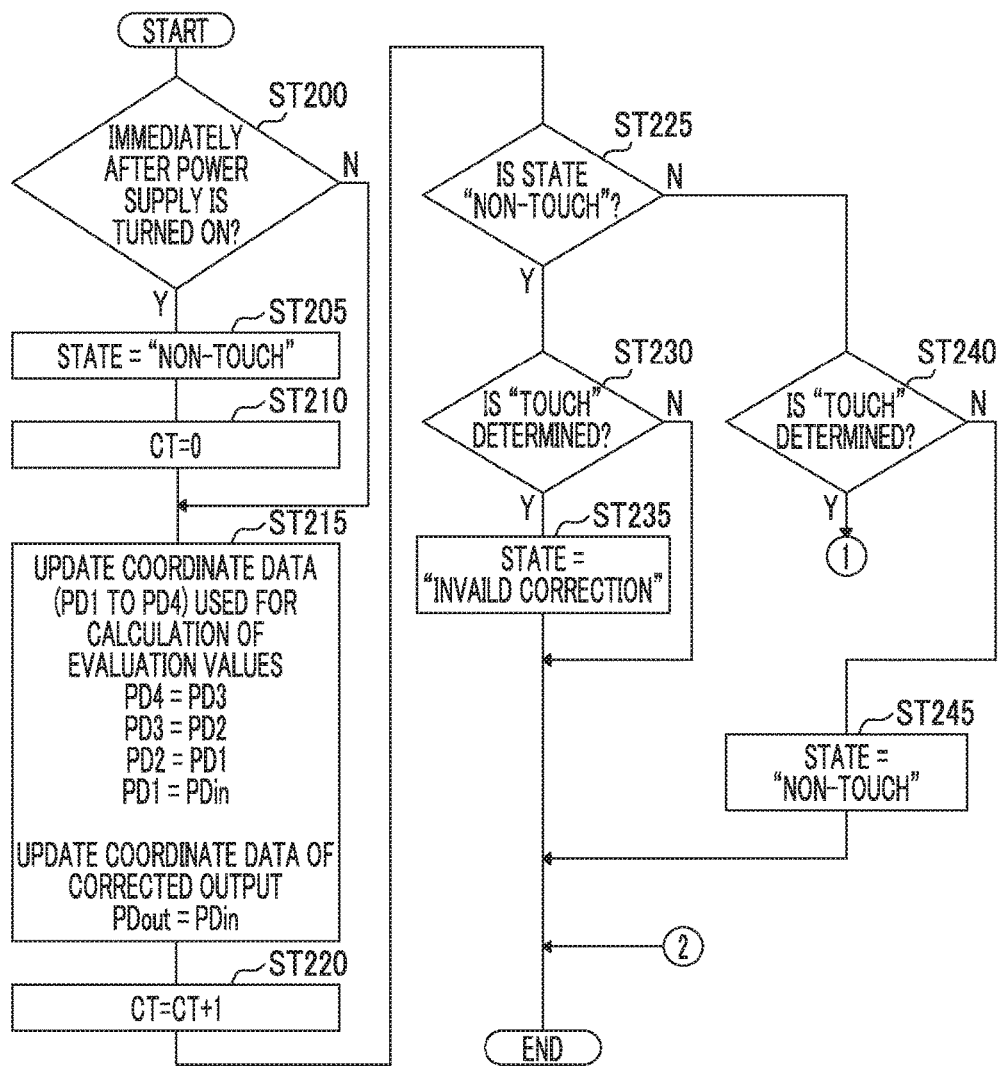
FIG. 8 is a first flowchart illustrating an example of a process of correcting an error of coordinate data according to acceleration.

FIGS. 7 and 8 are flowcharts illustrating an example of the error correction process in step ST120 in FIG. 1.

ST200, ST205, ST210:

In an initial state immediately after a power supply is turned on, the error correction unit 26 sets an operation state to "non-touch" and initializes a count value CT used for state transition to zero.

ST215:

The error determination unit 25 updates the coordinate data (PD1 to PD4) of four cycles used for calculation of the evaluation values (E1 to E3) to the latest ones. That is, the error determination unit 25 sets the third coordinate data PD3 in the preceding cycle as fourth coordinate data PD4 in the current cycle, the second coordinate data PD2 in the preceding cycle as third coordinate data PD3 in the current cycle, and the first coordinate data PD1 in the previous cycle as the second coordinate data PD2 in the current cycle. Further, the error determination unit 25 sets the latest coordinate data 32 (hereinafter referred to as "coordinate data PDin") generated in step ST110 (FIG. 7) as first coordinate data PD1 in the current cycle.

The error correction unit 26 equalizes the coordinate data 34 after error correction (hereinafter referred to as "coordinate data PDout") in the current cycle to the coordinate data PDin in this step. That is, the error correction unit 26 sets the latest coordinate data 32 as the coordinate data 34 after error correction as it is. In a case in which a predetermined condition (ST270 to ST280, and FIG. 9) is satisfied in a process to be described below, the error correction unit 26 changes the coordinate data PDout from the coordinate data PDin to the second coordinate data PD2 (ST285 and FIG. 9).

ST220:

The error correction unit 26 adds 1 to the count value CT.

ST225:

The error correction unit 26 determines whether or not the current state is "non-touch", proceeds to step ST230 if the current state is "non-touch", and otherwise proceeds to step ST240.

ST230 and ST235:

In a case in which the current state is "non-touch" and a determination result of the touch state determination unit 24 for the first coordinate data PD1 is a "touch" state, the error correction unit 26 causes the current state to transition from "non-touch" to "invalid correction" and ends the process. On the other hand, in a case in which the touch state determination unit 24 determines a "no-touch" state, the error correction unit 26 ends the process while maintaining the state as "non-touch".

ST240 and ST245:

In a case in which the current state is a state other than "non-touch" and the determination result of the touch state determination unit 24 for the first coordinate data PD1 is a "no-touch" state, the error correction unit 26 causes the current state to transition to "non-touch" and ends the process. On the other hand, in a case in which the touch state determination unit 24 determines a "touch" state, the error correction unit 26 proceeds to step ST250.

ST250:

In a case in which the current state is a state other than "non-touch" and the determination result of the touch state determination unit 24 is a state of "touch", the error correction unit 26 determines whether or not the current state is "valid correction". The error correction unit 26 proceeds step ST265 in a case in which the state is "valid correction" and to step ST255 in other cases.

ST255 and ST260:

The error correction unit 26 causes the state to transition to "valid correction" and ends the process in a case in which the count value CT is 3 or more, and ends the process while maintaining the state in a case in which the count value CT3 is smaller than 3.

The count value CT3 is incremented in step ST220 in each cycle of the detection operation, but is reset to zero in a case in which a determination result "error" (a determination result "Y") is obtained in all of error determination processes (ST270 to ST280), which will be described below (ST295). Therefore, in a case in which the count value CT is smaller than 3, data in which it is determined that there is an "error" in the error determination processes (ST270 to ST280) is included in three items of last coordinate data 32 (PD1, PD2, and PD3). If there is an error in the coordinate data, the error determination unit 25 cannot calculate correct evaluation values (E1 to E3). Therefore, in a case in which the count value CT3 is smaller than 3, the error correction unit 26 causes the state not to transition to "valid correction", and the correction process (ST285) to be described below is not performed (is deferred) in the next cycle.

ST265:

The error determination unit 25 calculates the first evaluation value E1, the second evaluation value E2, and the third evaluation value E3 on the basis of consecutive coordinate data 32 (PD1 to PD4) of four cycles of the same object.

ST270, ST275, and ST280:

The error determination unit 25 compares the first evaluation value E1 with the first threshold value Th1, compares the second evaluation value E2 with the second threshold value Th2, and compares the third evaluation value E3 with the third threshold value Th3. For example, the second threshold value Th2 is set to a value of ¼ of the first threshold value Th1, and the third threshold value Th3 is set to the same value as the first threshold value Th1. In a case in which the first evaluation value E1 is equal to or greater than the first threshold value Th1, the second evaluation value E2 is equal to or greater than the second threshold Th2, and the third evaluation value E3 is equal to or greater than the third threshold Th3, the error determination unit 25 determines that there is an error in the first coordinate data PD1. In this case, the error correction unit 26 proceeds to the correction process of step ST285. Otherwise, the error determination unit 25 determines that there is no error in the first coordinate data PD1. In a case in which it is determined in the error determination unit 25 that there is no error in the first coordinate data PD1, the error correction unit 26 ends the process without performing the correction process (ST285).

ST285:

In a case in which the error determination unit 25 determines that there is an error in the first coordinate data PD1 (=coordinate data PDin), the error correction unit 26 changes the coordinate data PDout from the coordinate data PDin to the second coordinate data PD2.

ST290 and ST295:

In a case in which the error correction unit 26 has performed the correction process of step ST285, the error correction unit 26 causes the state to transition from "valid correction" to "invalid correction", resets the count value to zero, and ends the process.

Figure 9:
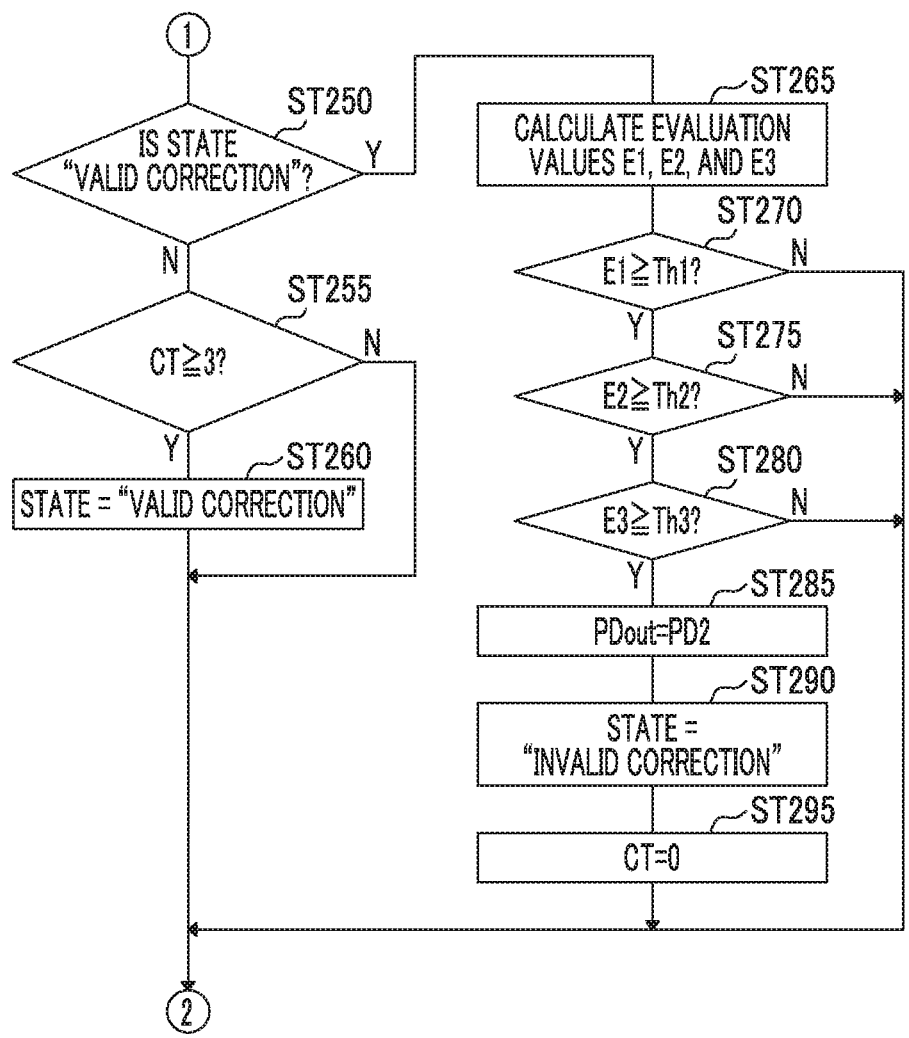
FIG. 9 is a second flowchart illustrating an example of a process of correcting an error of coordinate data according to acceleration.

Steps ST200 to ST295 in the flowchart illustrated in FIGS. 9 and 10 are processes for one object approaching the detection surface. When a plurality of objects approach the detection surface, the processes of steps ST200 to ST295 are executed for each object.

As described above, according to the input device of this embodiment, the evaluation values (E1 to E3) regarding the change in a velocity of the object at the coordinates of the detection surface indicated by the individual coordinate data 32 of the same object are calculated on the basis of the series of coordinate data 32 of the same object, and it is determined whether or not there is an error in each coordinate data 32 on the basis of the evaluation values (E1 to E3). Therefore, in a case in which the coordinate data 32 indicating an abnormal coordinate P is generated and an extreme change in a velocity of the object apparently occurs due to the influence of noise or the like, it is possible to accurately determine the error of the coordinate data 32 on the basis of the evaluation values (E1 to E3). Further, since the coordinate data 32 in which it is determined that there is an error in time-series of coordinate data 32 of the same object is corrected with data indicating the same coordinate P as that of coordinate data 32 immediately before such coordinate data 32, the error of the detection result of the coordinates generated by the influence of noise or the like can be effectively reduced.

Further, according to the input device of this embodiment, the evaluation values (E1 to E3) are calculated on the basis of the consecutive coordinate data 32 of four cycles of the same object, and it is determined whether or not there is an error in the last generated coordinate data 32 of the four cycles on the basis of the evaluation values (E1 to E3). Therefore, in a case in which the coordinate data 32 in which it is determined that there is an error is included in the coordinate data 32 of the three cycles of the first half in the coordinate data 32 of the four cycles, the evaluation values (E1 to E3) becomes inaccurate, and a determination of an error for last generated coordinate data 32 of the four cycles becomes also inaccurate. However, in the error correction unit 26, in a case in which the coordinate data 32 in which it is determined that there is an error is included in the consecutive coordinate data 32 of three cycles of the same object, a correction process for the coordinate data 32 generated in a cycle following the three cycles is deferred. Accordingly, since the correction process of the coordinate data 32 is not performed on the basis of the inaccurate error determination result, it is possible to appropriately correct the error of the coordinate data due to the influence of noise or the like.

Further, according to the input device of this embodiment, the second evaluation value E2 according to the magnitude of the second acceleration vector A2 (FIG. 3) or the third evaluation value E3 according to the magnitude of the third acceleration vector A3 (FIG. 4) is calculated, in addition to the first evaluation value E1 (FIG. 2) according to the magnitude of the first acceleration vector A1, and it is determined whether or not there is an error of the first coordinate data PD1 on the basis of the evaluation values. Therefore, even in a case in which the first acceleration vector A1 is large, it is determined that there is no error in the first coordinate data PD1 in a case in which a series of velocity vectors are close to the pattern illustrated in FIG. 5 or 6. Accordingly, a pattern of abnormal velocity vectors due to the influence of noise or the like is easily narrowed down, and a frequency at which it is erroneously determined that there is an error in the normal coordinate data is reduced. Thus, it is possible to improve accuracy of the error determination.

Several embodiments of the present invention have been described, but the present invention is not limited to the above-described embodiments and includes various variations.

In the input device according to the above-described embodiment, three types of evaluation values (E1 to E3) according to the magnitude of three types of acceleration vectors (A1 to A3) are calculated, and it is determined whether or not there is an error in the first coordinate data PD1 on the basis of the evaluation values, but the present invention is not limited to this example. In other embodiments of the present invention, the number of evaluation values calculated in the error determination unit 25 may be 2 or more or may be 4 or more.

In the input device according to the above-described embodiment, the evaluation values (E2 and E3) according to the magnitude of the second acceleration vector A2 that is a vector obtained by subtracting the third velocity vector V3 from the vector of the average of the first velocity vector V1 and the second velocity vector V2 or the third acceleration vector A3 that is a vector obtained by subtracting the vector of the average of the second velocity vector V2 and the third velocity vector V3 from the first velocity vector V1 are calculated, but the present invention is not limited thereto. In other embodiments of the present invention, an evaluation value according to a magnitude of an acceleration vector indicating a difference between an average vector of three or more consecutive velocity vectors and a velocity vector connecting to these velocity vectors may be calculated.

The input device of the embodiment of the present invention is not limited to a user interface device that inputs information using an operation of a finger or the like. That is, the input device of the embodiment of the present invention can be widely applied to devices that input information according to a state of approach of various objects not limited to a human body to the detection surface.

It should be understood by those skilled in the art that various modifications, combinations, sub-combinations and alterations may occur according to design requirements and other factors insofar as they are within the scope of the appended claims or the equivalents thereof.

What is claimed is:

1. An input device for inputting information according to a state of proximity of an object approaching thereto, the input device comprising:
    a detection surface to which the object approaches;
    a sensor that detects the state of proximity of the object at a plurality of positions of the detection surface;
    a sensor control unit configured to control the sensor such that the sensor performs a periodic detection operation, the state of proximity of the object being detected at the plurality of positions in each cycle of the periodic detection operation;
    a coordinate data generation unit configured to generate, in each cycle of the periodic detection operation, coordinate data indicating coordinates of a position of the object approaching the detection surface over a plurality of cycles based on a result of the detection of the sensor;
    an error determination unit configured to calculate an evaluation value regarding a change in velocity of the object at the position of the detection surface indicated by the coordinate data based on a series of the coordinate data of the object generated in the coordinate data generation unit during consecutive N cycles (N is an integer equal to or greater than 3), and to determine whether an error occurred in the coordinate data generated in an N-th cycle which is a last cycle of the consecutive N cycles based on the evaluation value; and
    an error correction unit configured to perform an error correction process for the coordinate data in a case where the error determination unit determines that an error occurred in the coordinate data of the object generated in the N-th cycle, such that the coordinate data of the object in the N-th cycle is changed to indicate the coordinates indicated by the coordinate data of the object obtained in an (N−1)-th cycle, while the error correction unit skips the error correction process for the coordinate data of the object generated in the N-th cycle in a case where any coordinate data of the object generated in consecutive (N−1) cycles prior to the N-th cycle has been determined that an error occurred therein,
    wherein the error determination unit calculates a first evaluation value for first coordinate data of the object which is a target for the error determination, the first evaluation value corresponding to a magnitude of a first acceleration vector for the first coordinate data, and determines that an error occurred in the first coordinate data in a case where the first evaluation value is greater than a first threshold value, and
    wherein the first acceleration vector is obtained by subtracting a second velocity vector from a first velocity vector, an i-th velocity vector being a vector from start-point coordinates indicated by (i+1)-th coordinate data obtained i cycles prior to a cycle in which the first coordinate data is obtained to end-point coordinates indicated by i-th coordinate data, where i is a natural number.

2. The input device according to claim 1,
wherein the error determination unit further calculates a second evaluation value corresponding to a magnitude of a second acceleration vector which is obtained by subtracting a third velocity vector from an average vector of the first velocity vector and the second velocity vector, and determines that no error occurred in the first coordinate data in a case where the second evaluation value is smaller than a second threshold value even in a case where the first evaluation value is greater than the first threshold value.

3. The input device according to claim 1,
wherein the error determination unit further calculates a third evaluation value corresponding to a magnitude of a third acceleration vector which is obtained by subtracting an average vector of the second velocity vector and the third velocity vector from the first velocity vector, and determines that no error occurred in the first coordinate data in a case where the third evaluation value is smaller than a third threshold value even in a case where the first evaluation value is greater than the first threshold value.

4. A method of controlling an input device for inputting information according to a state of proximity of an object, the input device including a detection surface to which the object approaches, and a sensor unit for detecting the state of proximity of the object at a plurality of positions of the detection surface, the method comprising:
  controlling the sensor unit such that the sensor unit performs a periodic detection operation, the state of proximity of the object being detected at the plurality of positions in each cycle of the periodic detection operation;
  generating, in each cycle of the periodic detection operation, coordinate data indicating coordinates of a position of the object approaching the detection surface over a plurality of cycles based on a result of the detection of the sensor unit;
  calculating an evaluation value regarding a change in a velocity of the object at the position of the detection surface indicated by the coordinate data based on a series of the coordinate data of the object generated in consecutive N cycles (N is an integer equal to or greater than 3);
  determining whether an error occurred in the coordinate data generated in an N-th cycle which is a last cycle of the consecutive N cycles based on the evaluation value; and
  performing an error correction process for the coordinate data in a case where it is determined that an error occurred in the coordinate data of the object generated in the N-th cycle, such that the coordinate data of the object generated in the N-th cycle is changed to indicate the coordinates indicated by the coordinate data of the object obtained in an (N−1)-th cycle, while skipping the error correction process for the coordinate data of the object generated in the N-th cycle in a case where any coordinate data of the object obtained in consecutive (N−1) cycles prior to the N-th cycle has been determined that an error occurred therein,
  wherein the calculating the evaluation value includes calculating a first evaluation value for first coordinate data which is an evaluation target for the error determination, the first evaluation value corresponding to a magnitude of a first acceleration vector for the first coordinate data, and the determining determines that an error occurred in the first coordinate data in a case where the first evaluation value is greater than a first threshold value, and
  wherein the first acceleration vector is obtained by subtracting a second velocity vector from a first velocity vector, an i-th velocity vector being a vector from start-point coordinates indicated by (i+1)-th coordinate data obtained i cycles prior to a cycle in which the first coordinate data is obtained to end-point coordinates indicated by i-th coordinate data, where i is a natural number.

5. The method of controlling an input device according to claim 4,
wherein the calculating the evaluation value further includes calculating a second evaluation value corresponding to a magnitude of a second acceleration vector, the second acceleration vector being obtained by subtracting a third velocity vector from an average vector of the first velocity vector and the second velocity vector, and the determining determines that no error occurred in the first coordinate data in a case where the second evaluation value is smaller than a second threshold value even in a case where the first evaluation value is greater than the first threshold value.

6. The method of controlling an input device according to claim 4,
wherein the calculating the evaluation value further includes calculating a third evaluation value corresponding to a magnitude of a third acceleration vector, the third acceleration vector being obtained by subtracting an average vector of the second velocity vector and the third velocity vector from the first velocity vector, and the determining determines that no error occurred in the first coordinate data in a case where the third evaluation value is smaller than a third threshold value even in a case where the first evaluation value is greater than the first threshold value.

7. A non-transitory computer-readable storage medium with an executable program stored therein, the program causing a computer to execute the method of controlling an input device according to claim 4.

* * * * *